US010454918B1

(12) United States Patent
Uhr et al.

(10) Patent No.: US 10,454,918 B1
(45) Date of Patent: Oct. 22, 2019

(54) METHOD FOR SSO SERVICE USING PKI BASED ON BLOCKCHAIN NETWORKS, AND DEVICE AND SERVER USING THE SAME

(71) Applicant: Coinplug, Inc., Gyeonggi-do (KR)

(72) Inventors: Joon Sun Uhr, Gyeonggi-do (KR); Jay Wu Hong, Seoul (KR); Moon Gju Suh, Seoul (KR)

(73) Assignee: COINPLUG, INC., Gyeonggi-Do (KR)

( * ) Notice: Subject to any disclaimer, the term of this patent is extended or adjusted under 35 U.S.C. 154(b) by 0 days.

(21) Appl. No.: 16/368,582

(22) Filed: Mar. 28, 2019

(30) Foreign Application Priority Data

Mar. 30, 2018 (KR) .................. 10-2018-0037113

(51) Int. Cl.
H04L 29/06 (2006.01)
H04L 9/32 (2006.01)
H04L 9/06 (2006.01)
G06F 16/182 (2019.01)

(52) U.S. Cl.
CPC ...... H04L 63/0815 (2013.01); G06F 16/1824 (2019.01); H04L 9/0643 (2013.01); H04L 9/3263 (2013.01); H04L 63/0823 (2013.01); H04L 2209/38 (2013.01)

(58) Field of Classification Search
CPC ............... H04L 63/0815; H04L 9/0643; H04L 63/0823; H04L 9/3263; H04L 2209/38; G06F 16/1824
See application file for complete search history.

(56) References Cited

U.S. PATENT DOCUMENTS

| | | | | |
|---|---|---|---|---|
| 10,057,243 B1* | 8/2018 | Kumar | ................ | H04L 9/0825 |
| 2017/0155515 A1* | 6/2017 | Androulaki | ............ | G06F 21/64 |
| 2017/0352027 A1* | 12/2017 | Zhang | ................ | H04L 9/0825 |
| 2018/0048461 A1* | 2/2018 | Jutla | ...................... | G06F 21/33 |
| 2018/0082296 A1* | 3/2018 | Brashers | .............. | G06Q 20/405 |
| 2018/0183587 A1* | 6/2018 | Won | ........................ | G06F 21/44 |
| 2018/0278427 A1* | 9/2018 | Thakore | ................ | H04L 9/3268 |
| 2019/0004789 A1* | 1/2019 | Mills | ........................ | G06F 8/70 |

OTHER PUBLICATIONS

Zhu et al., "Autonomic Identity Framework for the Internet of Things", 2017 International Conference on Cloud and Autonomic Computing (ICCAC), Date of Conference: Sep. 18-22, 2017.*

* cited by examiner

Primary Examiner — Morshed Mehedi
(74) Attorney, Agent, or Firm — Holzer Patel Drennan

(57) ABSTRACT

A method for a Single Sign On (SSO) service using a Public Key Infrastructure (PKI) based on blockchain networks, and device and server using the same are provided. The method has objects and effects of providing (a) the SSO based on blockchain network technology to efficiently protect authentication information on users from external attacks, (b) the SSO assuring information security and preventing forgery by applying a hash function and encryption to user certificates, and (c) the SSO preventing problems incurred by information theft beforehand through a user-authentication using disposable verification values.

18 Claims, 8 Drawing Sheets

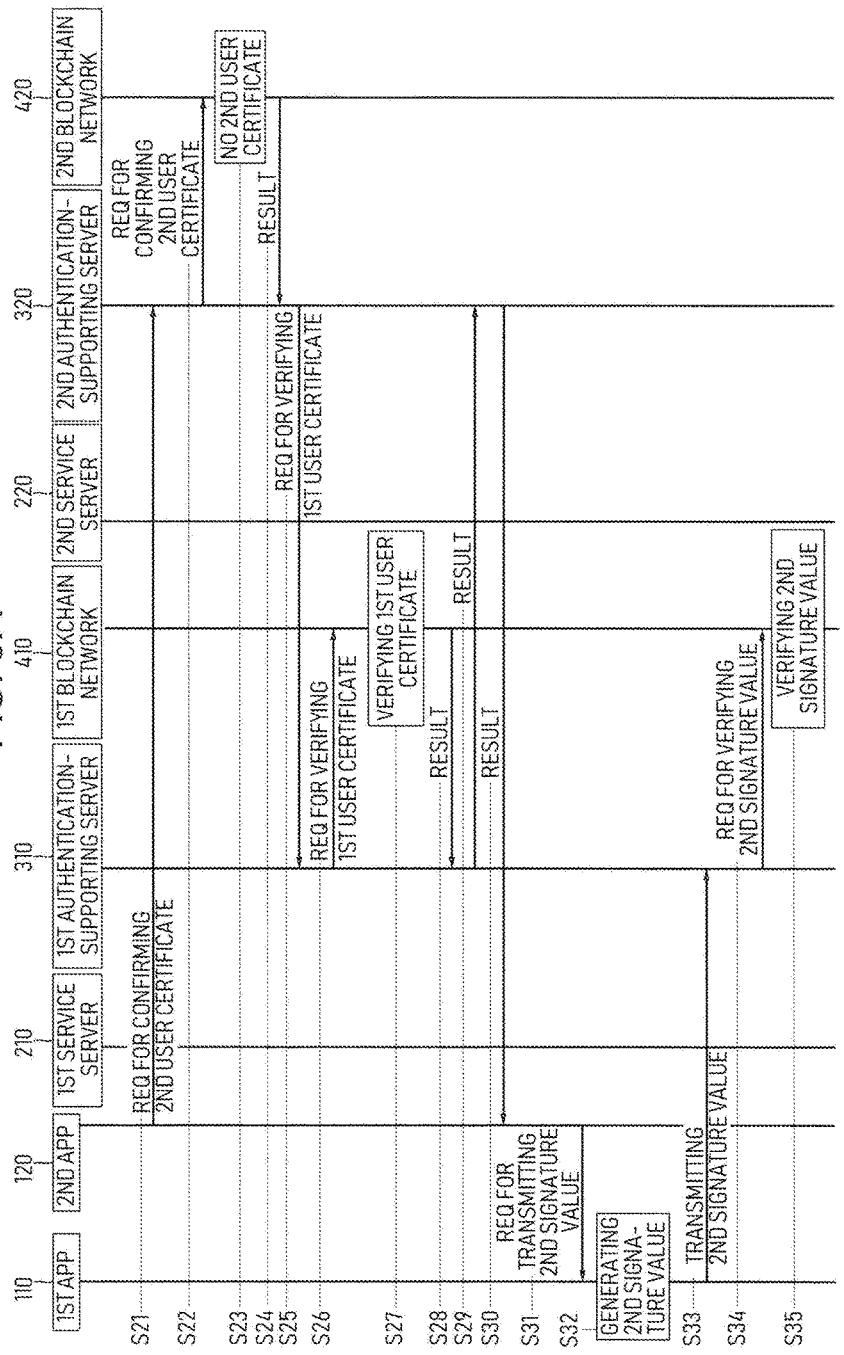

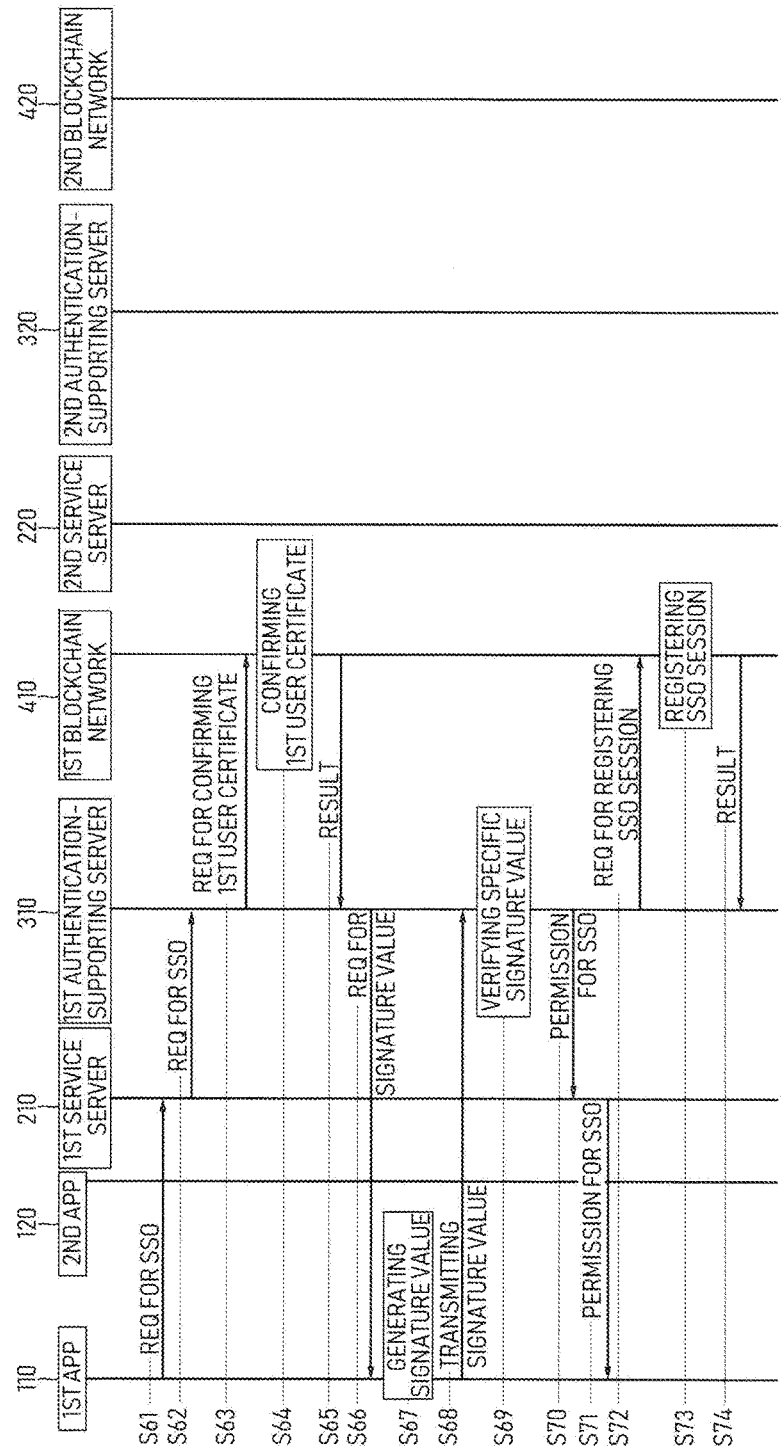

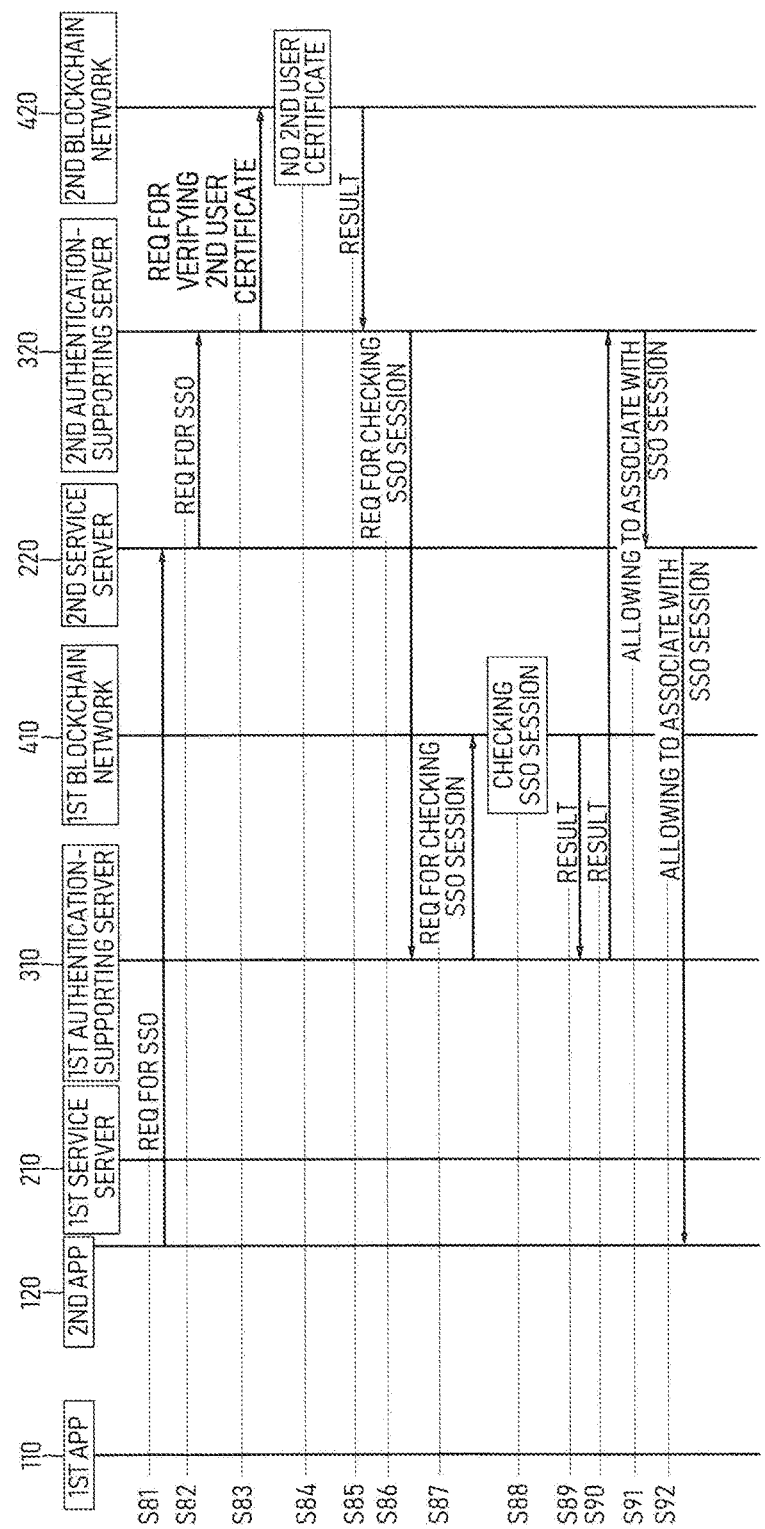

METHOD FOR SSO SERVICE USING PKI BASED ON BLOCKCHAIN NETWORKS, AND DEVICE AND SERVER USING THE SAME

FIELD OF THE DISCLOSURE

The present disclosure relates to a method for a Single Sign On (SSO) service using a Public Key Infrastructure (PKI) based on blockchain networks.

BACKGROUND OF THE DISCLOSURE

As the high-speed Internet has been developed, users' requirements for various services using the Internet have been increased.

In this regard, users manage IDs and passwords for the respective services or respective application programs. Further, the application programs or companies such as a company providing a financial service requests personal information such as passwords for certificates in addition to the IDs and passwords for the IDs from the users in order to control access of the users.

However, since the variety and number of the services have been increasing, the number of the IDs and passwords for the IDs has also been increased correspondingly, which has caused the users' great inconvenience.

Specifically, since the variety and number of the services based on smart devices have been increasing, managing the respective IDs, passwords for each service has caused social expenses in addition to the users' inconvenience. In other words, users usually have same or different authentication information for each of services, and the service provider should manage the authentication information on the users for each of the services, which causes unnecessary expenses.

To solve this problem, an authentication system named Single Sign On (SSO) has been introduced to the various services and application programs recently, providing both the users and the companies with efficient management of the IDs and passwords.

However, the SSO has a shortcoming that hackers can access all services used by a specific user by stealing specific authentication information on the specific user only once.

Thus, there is a need for developing new algorithms to efficiently protect the authentication information on the users, such as personal information, from external attacks while also providing integrated login such as the SSO.

SUMMARY OF THE DISCLOSURE

It is an object of the present disclosure to solve all the aforementioned problems.

It is another object of the present disclosure to provide a Single Sign On (SSO) based on blockchain network technology to efficiently protect authentication information on users from external attacks.

It is still another object of the present disclosure to provide the SSO assuring information security and preventing forgery by applying a hash function and encryption to user certificates.

It is still yet another object of the present disclosure to provide the SSO preventing problems incurred by information theft beforehand through a user-authentication using disposable verification values.

In accordance with one aspect of the present disclosure, there is provided a method for a Single Sign On (SSO) service using a Public Key Infrastructure (PKI) based on blockchain networks, including steps of: (a) a first authentication-supporting server performing (i) if information on requesting a registration of a first user certificate using a first PKI certificate generated through a first app of a user device is acquired from the user device or from another device connected with the user device, a process of transmitting a request for a first signature value to the first app of the user device, wherein the first app has been installed in the user device and allows use of a first service provided by a first service server, and wherein the first signature value is obtained by signing a first verification value for reference with a first private key of the first PKI certificate, (ii) if the first signature value is acquired from the user device or from another device connected with the user device, a process of verifying or supporting another device connected with the first authentication-supporting server to verify the first signature value, and (iii) if the first signature value is determined as valid, a process of registering or supporting another device connected with the first authentication-supporting server to register the first user certificate in the first blockchain network, wherein the first user certificate includes a first public key of the first PKI certificate and first registration information thereon; (b) the first authentication-supporting server performing (i) if it is confirmed that a second user certificate is not registered in a second blockchain network in response to a request for confirming the second user certificate by using a second app of the user device, and if information on requesting a verification of the first user certificate is acquired from a second authentication-supporting server connected with a second service server, a process of confirming or supporting another device connected with the first authentication-supporting server to confirm the first user certificate registered in the first blockchain network, wherein the second app has been installed in the user device and allows use of a second service provided by the second service server, and wherein the second user certificate is registered in the second blockchain network as corresponding to the second app, and (ii) a process of allowing the second app to transmit a request for a second signature value to the first app, by transmitting or supporting another device connected with the first authentication-supporting server to transmit a result on verifying the first user certificate including a second verification value for reference to the second app of the user device through the second authentication-supporting server connected with the second service server, wherein the second signature value is obtained by signing the second verification value for reference with the first private key of the first PKI certificate; and (c) the first authentication-supporting server performing (i) if the second signature value is obtained from the first app of the user device or from another device connected with the user device, a process of verifying or supporting the first blockchain network or another device connected with the first authentication-supporting server to verify the second signature value, (ii) if the second signature value is determined as valid, by transmitting or allowing another device connected with the first authentication-supporting server to transmit a result on verifying the second signature value to the first app of the user device, (ii-1) a process of supporting the first app of the user device to transmit the result on verifying the second signature value to the second app of the user device, so as to allow the second app to generate a second PKI certificate and transmit information on requesting a registration of the second user certificate using the second PKI certificate to the second authentication-supporting server, (ii-2) a process of supporting the second authentication-supporting server to transmit a request for a third signature value to the second app in response to the information on requesting the registration of the second user certificate, wherein the third signature value is obtained by signing a third verification value with a second private key of the second PKI certificate, (ii-3) if the third signature value is acquired from the user device or from another device connected with the user device, a process of supporting the second authentication-supporting server to verify or to allow the second blockchain network or another device connected with the second authentication-supporting server to verify the third signature value, and (ii-4) if the third signature value is determined as valid, a process of supporting the second authentication-supporting server to register the second user certificate in the second blockchain network, wherein the second user certificate includes a second public key of the second PKI certificate and second registration information thereon.

As one example, when either the first app of the user device or the second app of the user device generates its corresponding first PKI certificate or its corresponding second PKI certificate, a user of the user device sets path information for accessing either the first private key of the first PKI certificate or the second private key of the second PKI certificate.

As one example, the first authentication-supporting server confirms either a first verification value for comparison extracted by applying the first public key of the first PKI certificate to the first signature value or a second verification value for comparison extracted by applying the first public key of the first PKI certificate to the second signature value, and verifies or supports the first blockchain network to verify either the first signature value or the second signature value by comparing the first verification value for comparison with the first verification value for reference or the second verification value for comparison with the second verification value for reference.

As one example, the first user certificate registered in the first blockchain network or the second user certificate registered in the second blockchain network includes at least one of (i) the first public key or the second public key, (ii) user-identifying information, (iii) user device-identifying information, (iv) first app-identifying information or second app-identifying information, (v) a push token ID corresponding to either the first app or the second app, and (vi) personal information on the user.

As one example, at the step of (b), the first authentication-supporting server further adds (i) a first app ID corresponding to the first user certificate confirmed from the first blockchain network and (ii) a URL scheme to be used for transmitting the second verification value for reference to the first app and for requesting a signature on the second verification value for reference into the result on confirming the first user certificate, to thereby transmit or support another device connected with the first authentication-supporting server to transmit the result on confirming the first user certificate to the second app.

In accordance with another aspect of the present disclosure, there is provided a method for a Single Sign On (SSO) service using a Public Key Infrastructure (PKI) based on blockchain networks, including steps of: (a) a first authentication-supporting server performing, on condition that respective user certificates using respective PKI certificates generated by multiple apps of a user device have been registered in respective blockchain networks corresponding to respective service servers, if information on requesting an SSO using login information on a specific app of the user device is acquired from the user device or a specific service server, a process of confirming or supporting another device connected with the first authentication-supporting server to confirm whether a specific user certificate corresponding to the login information on the specific app of the user device is registered in a specific blockchain network corresponding to the specific service server, wherein the multiple apps of the user device have been installed in the user device and allow uses of respective services provided by the respective service servers; and (b) the first authentication-supporting server performing, if it is confirmed that the specific user certificate is not registered in the specific blockchain network, (i) a process of supporting at least one second authentication-supporting server, among respective second authentication-supporting servers corresponding to the respective service servers, to check or to allow another device connected with the second authentication-supporting server to check an SSO session from at least one certain blockchain network connected with the second authentication-supporting server, by transmitting a request for confirming whether there is the SSO session to the second authentication-supporting server, and (ii) if information on checking the SSO session is acquired from the second authentication-supporting server, a process of allowing use of a specific service provided by the specific service server through the specific app of the user device by supporting the specific service server or the specific app of the user device to associate with the SSO session.

As one example, the method further includes a step of (c) the first authentication-supporting server performing, if it is confirmed that the specific user certificate is registered in the specific blockchain network, (i) processes of transmitting a request for the specific signature value to the specific app of the user device and of allowing the specific app of the user device to transmit a specific signature value to the first authentication-supporting server by transmitting, wherein the specific signature value is obtained by signing a specific verification value for reference with a specific private key of a specific PKI certificate, (ii) if the specific signature value is acquired and determined as valid, a process of allowing use of the specific service provided by the specific service server through the specific app of the user device, and (iii) a process of registering or supporting another device connected with the first authentication-supporting server to register a specific SSO session corresponding to a log in/out state of the specific app of the user device to/of the specific service server in the specific blockchain network.

As one example, at the step of (a), the respective user certificates respectively include at least one of (i) public keys respectively corresponding to the multiple apps, (ii) user-identifying information, (iii) user device-identifying information, (iv) multiple apps-identifying information, (v) push token IDs respectively corresponding to the multiple apps, and (vi) personal information on the user, and the login information on the specific app of the user device includes at least one of (i) the public keys, (ii) the user-identifying information, and (iii) the user device-identifying information.

As one example, at the step of (c), the first authentication-supporting server confirms a specific verification value for comparison extracted by applying a specific public key of the specific PKI certificate to the specific signature value, and verifies or supports either the specific blockchain network or another device connected with the first authentication-supporting server to verify the specific signature value by comparing the specific verification value for comparison with the specific verification value for reference.

In accordance with still another aspect of the present invention, there is provided a first authentication-supporting server for a Single Sign On (SSO) service using a Public Key Infrastructure (PKI) based on blockchain networks, including: at least one processor configured to execute the instructions to perform: (I) (I-1) if information on requesting a registration of a first user certificate using a first PKI certificate generated through a first app of a user device is acquired from the user device or from another device connected with the user device, a process of transmitting a request for a first signature value to the first app of the user device, wherein the first app has been installed in the user device and allows use of a first service provided by a first service server, and wherein the first signature value is obtained by signing a first verification value for reference with a first private key of the first PKI certificate, (I-2) if the first signature value is acquired from the user device or from another device connected with the user device, a process of verifying or supporting another device connected with the first authentication-supporting server to verify the first signature value, and (I-3) if the first signature value is determined as valid, a process of registering or supporting another device connected with the first authentication-supporting server to register the first user certificate in the first blockchain network, wherein the first user certificate includes a first public key of the first PKI certificate and first registration information thereon; (II) (II-1) if it is confirmed that a second user certificate is not registered in a second blockchain network in response to a request for confirming the second user certificate by using a second app of the user device, and if information on requesting a verification of the first user certificate is acquired from a second authentication-supporting server connected with a second service server, a process of confirming or supporting another device connected with the first authentication-supporting server to confirm the first user certificate registered in the first blockchain network, wherein the second app has been installed in the user device and allows use of a second service provided by the second service server, and wherein the second user certificate is registered in the second blockchain network as corresponding to the second app, and (II-2) a process of allowing the second app to transmit a request for a second signature value to the first app, by transmitting or supporting another device connected with the first authentication-supporting server to transmit a result on verifying the first user certificate including a second verification value for reference to the second app of the user device through the second authentication-supporting server connected with the second service server, wherein the second signature value is obtained by signing the second verification value for reference with the first private key of the first PKI certificate; and (III) (III-1) if the second signature value is obtained from the first app of the user device or from another device connected with the user device, a process of verifying or supporting the first blockchain network or another device connected with the first authentication-supporting server to verify the second signature value, (III-2) if the second signature value is determined as valid, by transmitting or allowing another device connected with the first authentication-supporting server to transmit a result on verifying the second signature value to the first app of the user device, (III-2-a) a process of supporting the first app of the user device to transmit the result on verifying the second signature value to the second app of the user device, so as to allow the second app to generate a second PKI certificate and transmit information on requesting a registration of the second user certificate using the second PKI certificate to the second authentication-supporting server, (III-2-b) a process of supporting the second authentication-supporting server to transmit a request for a third signature value to the second app in response to the information on requesting the registration of the second user certificate, wherein the third signature value is obtained by signing a third verification value with a second private key of the second PKI certificate, (III-2-c) if the third signature value is acquired from the user device or from another device connected with the user device, a process of supporting the second authentication-supporting server to verify or to allow the second blockchain network or another device connected with the second authentication-supporting server to verify the third signature value, and (III-2-d) if the third signature value is determined as valid, a process of supporting the second authentication-supporting server to register the second user certificate in the second blockchain network, wherein the second user certificate includes a second public key of the second PKI certificate and second registration information thereon.

As one example, when either the first app of the user device or the second app of the user device generates its corresponding first PKI certificate or its corresponding second PKI certificate, a user of the user device sets path information for accessing either the first private key of the first PKI certificate or the second private key of the second PKI certificate.

As one example, the processor confirms either a first verification value for comparison extracted by applying the first public key of the first PKI certificate to the first signature value or a second verification value for comparison extracted by applying the first public key of the first PKI certificate to the second signature value, and verifies or supports the first blockchain network to verify either the first signature value or the second signature value by comparing the first verification value for comparison with the first verification value for reference or the second verification value for comparison with the second verification value for reference.

As one example, the first user certificate registered in the first blockchain network or the second user certificate registered in the second blockchain network includes at least one of (i) the first public key or the second public key, (ii) user-identifying information, (iii) user device-identifying information, (iv) first app-identifying information or second app-identifying information, (v) a push token ID corresponding to either the first app or the second app, and (vi) personal information on the user.

As one example, at the process of (II), the processor further adds (i) a first app ID corresponding to the first user certificate confirmed from the first blockchain network and (ii) a URL scheme to be used for transmitting the second verification value for reference to the first app and for requesting a signature on the second verification value for reference into the result on confirming the first user certificate, to thereby transmit or support another device connected with the first authentication-supporting server to transmit the result on confirming the first user certificate to the second app.

In accordance with still yet another aspect of the present invention, there is provided a first authentication-supporting server for a Single Sign On (SSO) service using a Public Key Infrastructure (PKI) based on blockchain networks, including: at least one memory that stores instructions; and at least one processor configured to execute the instructions to perform: (I) on condition that respective user certificates using respective PKI certificates generated by multiple apps of a user device have been registered in respective blockchain networks corresponding to respective service servers, if information on requesting an SSO using login information on a specific app of the user device is acquired from the user device or a specific service server, a process of confirming or supporting another device connected with the first authentication-supporting server to confirm whether a specific user certificate corresponding to the login information on the specific app of the user device is registered in a specific blockchain network corresponding to the specific service server, wherein the multiple apps of the user device have been installed in the user device and allow uses of respective services provided by the respective service servers; and (II) the first authentication-supporting server performing, if it is confirmed that the specific user certificate is not registered in the specific blockchain network, (II-1) a process of supporting at least one second authentication-supporting server, among respective second authentication-supporting servers corresponding to the respective service servers, to check or to allow another device connected with the second authentication-supporting server to check an SSO session from at least one certain blockchain network connected with the second authentication-supporting server, by transmitting a request for confirming whether there is the SSO session to the second authentication-supporting server, and (II-2) if information on checking the SSO session is acquired from the second authentication-supporting server, a process of allowing use of a specific service provided by the specific service server through the specific app of the user device by supporting the specific service server or the specific app of the user device to associate with the SSO session.

As one example, the first authentication-supporting server further includes a process of (III) if it is confirmed that the specific user certificate is registered in the specific blockchain network, (III-1) processes of transmitting a request for the specific signature value to the specific app of the user device and of allowing the specific app of the user device to transmit a specific signature value to the first authentication-supporting server by transmitting, wherein the specific signature value is obtained by signing a specific verification value for reference with a specific private key of a specific PKI certificate, (III-2) if the specific signature value is acquired and determined as valid, a process of allowing use of the specific service provided by the specific service server through the specific app of the user device, and (III-3) a process of registering or supporting another device connected with the first authentication-supporting server to register a specific SSO session corresponding to a log in/out state of the specific app of the user device to/of the specific service server in the specific blockchain network.

As one example, at the process of (I), the respective user certificates respectively include at least one of (i) public keys respectively corresponding to the multiple apps, (ii) user-identifying information, (iii) user device-identifying information, (iv) multiple apps-identifying information, (v) push token IDs respectively corresponding to the multiple apps, and (vi) personal information on the user, and the login information on the specific app of the user device includes at least one of (i) the public keys, (ii) the user-identifying information, and (iii) the user device-identifying information.

As one example, at the process of (III), the processor confirms a specific verification value for comparison extracted by applying a specific public key of the specific PKI certificate to the specific signature value, and verifies or supports either the specific blockchain network or another device connected with the first authentication-supporting server to verify the specific signature value by comparing the specific verification value for comparison with the specific verification value for reference.

Further, in accordance with one example embodiment of the present disclosure, the user device and the authentication-supporting server for performing methods mentioned above are provided.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which:

FIGS. 5A and 5B are drawings schematically illustrating a method for a registration of a second user certificate in accordance with one example embodiment of the present disclosure.

FIGS. 6A and 6B are drawings schematically illustrating a method for performing the SSO in accordance with one example embodiment of the present disclosure.

DETAILED DESCRIPTION OF THE PREFERRED EMBODIMENTS

Figure 1:
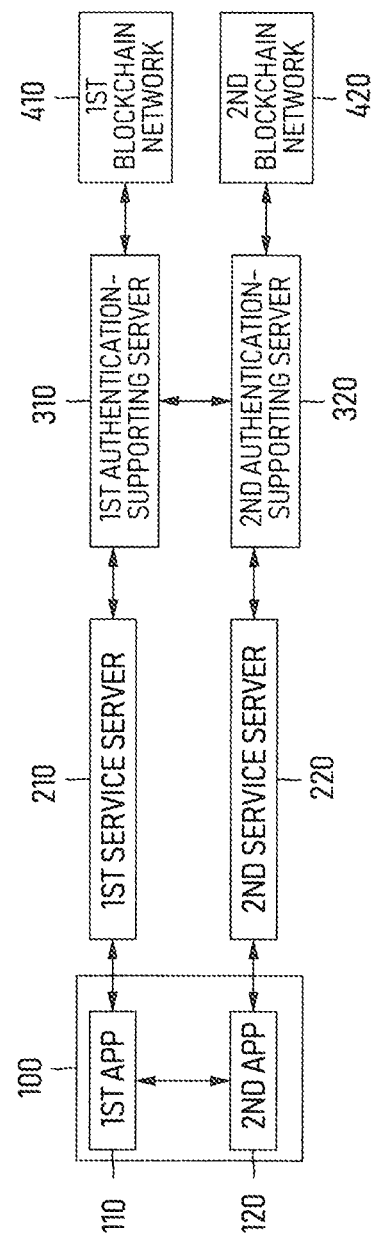
FIG. 1 is a drawing schematically illustrating a Single Sign On (SSO) system based on blockchain networks in accordance with one example embodiment of the present disclosure.

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Further, as used in this specification and the appended claims, the singular forms "a," "an," and "the" include plural referents unless the content and context clearly dictates otherwise.

Furthermore, a term "specific" is added to terms or concepts related to major subjects who is active in taking actions, a term "associated" is added to terms or concepts related to other subjects, and in descriptions below, the term "specific" and the term "associated" may be omitted, as either of the concepts is apparent from the context. However, the terms "specific" and "associated" are used in claims for clarification.

For reference, in the description below, the phrase "for reference" is added for terms related to objects or concepts that are registered or stored in advance to be used as a reference, and the phrase "for comparison" is added for terms related to objects or concepts that are presented or requested to be compared with, to avoid possible confusion.

It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled.

To allow those skilled in the art to the present disclosure to be carried out easily, the example embodiments of the present disclosure by referring to attached diagrams will be explained in detail as shown below.

FIG. 1 is a drawing schematically illustrating a Single Sign On (SSO) system based on blockchain networks in accordance with one example embodiment of the present disclosure. Herein, the SSO system may include a user device 100, a first service server 210, a second service server 220, a first authentication-supporting server 310, a second authentication-supporting server 320, a first blockchain network 410 and a second blockchain network 420.

First, the user device 100 may be used to provide users with information for various services and to input and show information for an SSO. Herein, the user device 100 may include a PC (Personal Computer), a mobile computer, a PDA/EDA, a mobile phone, a smart phone, a tablet, an IoT device, etc. And, the user device 100 is not limited thereto, and may include any mobile device like a digital camera, a personal navigation device, and a mobile gaming device, etc. capable of wired and wireless communication.

Next, the first service server 210 and the second service server 220 may provide the users with the various services.

Next, the first authentication-supporting server 310 and the second authentication-supporting server 320 may perform the SSO based on the blockchain networks. Identical reference numerals are for convenience of explanation but not intended for representing sameness of separate devices. Herein, the first authentication-supporting server 310 and the second authentication-supporting server 320 may correspond to each node of the respective blockchain networks. Also, they may be servers or transaction servers managing the nodes of the respective blockchain networks. Herein, the first and the second authentication-supporting servers 310 and 320 may also be configured to be different from each other or to be same as each other in other example embodiments of the present disclosure.

Meanwhile, the user device 100, the first service server 210, the second service server 220, the first authentication-supporting server 310, and the second authentication-supporting server 320 may respectively include at least one additional component not illustrated in FIG. 1, e.g., a communication part for transmitting and/or receiving information, a memory for storing instructions, and a processor for executing the instructions. However, such description does not exclude an integrated device including any combination of the processor, the memory, the communication part, a medium, or any other computing components for implementing the present disclosure.

Specifically, the first authentication-supporting server 310 and the second authentication-supporting server 320 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part of such devices may transmit requests to and receive responses from other connected devices. As one example, such requests and responses may be carried out by the same TCP session, but the scope of the present disclosure is not limited thereto. For example, they could be transmitted and received as UDP datagrams.

Also, the processor of such devices may include hardware configuration of MPU (Micro Processing Unit) or CPU (Central Processing Unit), cache memory, data bus, etc. Additionally, any OS and software configuration of applications that achieve specific purposes may be further included.

Next, the first blockchain network 410 may be connected with the first authentication-supporting server 310 and the second blockchain network 420 may be connected with the second authentication-supporting server 320. Herein, the first blockchain network 410 and the second blockchain network 420 may perform a distributive processing of data by recording at least one chain of data blocks in at least one distributed ledger. Also, the first blockchain network 410 and the second blockchain network 420 may be respectively configured with multiple blockchain networks, and may respectively be private blockchain networks or public blockchain networks.

Hereinafter, an explanation on a method for an SSO service using a Public Key Infrastructure (PKI) based on the blockchain networks through the SSO system in accordance with one example embodiment of the present disclosure will be made as below.

First, by referring to FIG. 2, an explanation on a method for a registration of a first user certificate in the first blockchain network 410 will be made below.

A user may use a first app 110 of the user device 100 to transmit a request for generating a first PKI certificate in order to register the first user certificate. Herein, the first app 110 may be an app corresponding to the first user certificate among multiple apps installed in the user device 100, and the first user certificate may correspond to one or more services provided by a first service server 210. In response to the request for generating the first PKI certificate, the user may use the user device 100 to generate the first PKI certificate, preferably to set first path information for accessing a first private key of the first PKI certificate, through the first app 110 at a step of S1. Herein, the first path information may include at least one of (i) a password, (ii) a PIN code, (iii) fingerprint information of the user, and (iv) biometric information of the user. Also, input of the first path information may be omitted as the case may be.

Thereafter, if the first path information is set, the user device 100 may allow the first app 110 to generate the first PKI certificate including the first private key and a first public key at a step of S2. Herein, the first private key may be stored in Secure Elements (SE) of the user device 100.

And, the user device 100 may transmit or support the first service server 210 or another device connected with the user device 100 to transmit information on requesting a registration of the first user certificate using the first PKI certificate generated through the first app 110 to the first authentication-supporting server 310 at a step of S3. Herein, the information on requesting the registration of the first user certificate may include at least one of (i) the first public key, (ii) user-identifying information such as a phone number, (iii) user device-identifying information such as a UUID (universally unique identifier), (iv) first app-identifying information, (v) a push token ID corresponding to the first app, and (vi) personal information on the user.

Before generating the first PKI certificate, on condition that the user has logged in to the first service server 210 with general ways using an ID, a password, etc., the user may use the first app 110 of the user device 100 to perform actions for the registration of the first user certificate. Also, the user may use the first app 110 of the user device 100 to perform additional authentication using an ARS, a bank account, a credit card, and a public certificate.

Then, the first authentication-supporting server 310 may acquire the information on requesting the registration of the first user certificate transmitted from the user device 100 or the first service server 210 through the communication part of the first authentication-supporting server 310. In response to the information on requesting the registration of the first user certificate, a processor of the first authentication-supporting server 310 may transmit or support the first service server 210 or another device connected with the first authentication-supporting server 310 to transmit a request for a first signature value to the first app 110 of the user device 100 at a step of S4.

And, in response to the request for the first signature value, the first app 110 of the user device 100 may generate the first signature value by signing a first verification value for reference with the first private key of the first PKI certificate at a step of S5. Herein, the first verification value for reference may include a nonce, an OTP (one time password), or a time stamp, etc. Then, the first app 110 may transmit or support the first service server 210 or another device linked with the user device 100 to transmit the generated first signature value to the first authentication-supporting server 310 at a step of S6. Herein, before generating the first signature value, the first app 110 of the user device 100 may request the user to input his or her path information. If the inputted path information is as same as the preset first path information, the first app 110 may generate the first signature value.

Thereafter, the first authentication-supporting server 310 may verify or support another device connected with the first authentication-supporting server 310 to verify whether the acquired first signature value is valid at a step of S7.

Herein, the verification of the first signature value may be performed by using the first public key corresponding to the first private key used for signing the first verification value for reference. That is, the first authentication-supporting server 310 may acquire a first verification value for comparison extracted by applying the first public key to the first signature value. Then, the first authentication-supporting server 310 may verify the first signature value by comparing the first verification value for comparison with the first verification value for reference.

Then, if the first signature value is confirmed as valid, the first authentication-supporting server 310 may transmit or support another device connected with the first authentication-supporting server 310 to transmit a request for the registration of the first user certificate including the first public key and registration information thereon to the first blockchain network 410 at a step of S8. Then, the first blockchain network 410 may register the first user certificate at a step of S9, and may transmit a result on registering the first user certificate to the first authentication-supporting server 310 at a step of S10.

Thereafter, if the result on registering the first user certificate is acquired, the first authentication-supporting server 310 may transmit or support another device connected with the first authentication-supporting server 310 or the first service server 210 to transmit the result on registering the first user certificate to the user device 100 at a step of S11. Herein, the first user certificate registered in the first blockchain network 410 may include at least one of (i) the first public key, (ii) the user-identifying information such as the phone number, (iii) the user device-identifying information such as the UUID, (iv) the first app-identifying information, (v) the push token ID corresponding to the first app, and (vi) the personal information on the user. Also, the first user certificate may include one or more hash values of at least one of (i) the first public key, (ii) the user-identifying information such as the phone number, (iii) the user device-identifying information such as the UUID, (iv) the first app-identifying information, (v) the push token ID corresponding to the first app, and (vi) the personal information on the user.

Although the first user certificate has been registered in the first blockchain network 410 in the explanation above, there may be one or more other examples such as the first blockchain network 410 being configured with multiple blockchain networks. As one example, if the first blockchain network 410 is configured with a (1_1)-st blockchain network and a (1_2)-nd blockchain network, the first authentication-supporting server 310 may register the first user certificate in the (1_1)-st blockchain network and the (1_2)-nd blockchain network as below.

The first authentication-supporting server 310 may register or support another device connected with the first authentication-supporting server 310 to register the first user certificate in the (1_1)-st blockchain network and the (1_2)-nd blockchain network.

And, if one or more anchoring conditions for registering a certain hash value in the (1_2)-nd blockchain network are satisfied, the first authentication-supporting server 310 may generate a first specific hash value by applying a hash function to the first user certificate. Then, the first authentication-supporting server 310 may generate a first representative hash value or its processed value, which is a Merkle root, by using the first specific hash value and its corresponding at least one associated hash value.

Also, the first authentication-supporting server 310 may register or support the (1_1)-st blockchain network or another device connected with the first authentication-supporting server 310 to register the generated first representative hash value or its processed value in the (1_2)-nd blockchain network.

Meanwhile, the first authentication-supporting server 310 may store and manage the first specific hash value and the associated hash value in a certain data structure. Herein, the data structure may vary and one example may be a Merkle tree.

That is, the first authentication-supporting server 310 may generate or support another device to generate the Merkle tree whose specific leaf node has the first specific hash value. If the anchoring conditions are satisfied, the first authentication-supporting server 310 may register the first representative hash value or its processed value in the (1_2)-st blockchain network, or may support the (1_1)-st blockchain network or another device connected with first authentication-supporting server 310 to register the first representative hash value or its processed value in the (1_2)-nd blockchain network.

More specifically, (x1) the first authentication-supporting server 310 may calculate or support the (1_1)-st blockchain network or another device connected with the first authentication-supporting server 310 to calculate an intermediate value by using (i) the first specific hash value and (ii) a hash value allocated to a sibling node of a specific leaf node where the first specific hash value is allocated, and may allocate or support the (1_1)-st blockchain network or another device to allocate a hash value of the intermediate value to a parent node of the specific leaf node. (x2) If the parent node is a root node of the Merkle tree, the hash value of the intermediate value allocated to the parent node becomes the first representative hash value or its processed value. (x3) Otherwise, if the parent node is not the root node of the Merkle tree, the first authentication-supporting server 310 may repeat or support the (1_1)-st blockchain network or another device connected with the first authentication-supporting server 310 to repeat the processes from (x1) to (x3) by regarding the hash value of the intermediate value allocated to the parent node as the first specific hash value and regarding the parent node as the specific leaf node.

Then, the first authentication-supporting server 310 may register or support the (1_1)-st blockchain network or another device connected with the first authentication-supporting server 310 to register the hash value finally allocated to the root node of the Merkle tree in the (1_2)-nd blockchain network, as the first representative hash value or its processed value. Herein, for example, said its processed value may be acquired by applying a hex computation to the first representative hash value.

Meanwhile, if the first authentication-supporting server 310 stores the first specific hash value and the associated hash value in a (1_1)-st data structure and then stores and manages a (1_2)-nd data structure identical in a form to the (1_1)-st data structure, the (1_1)-st data structure and the (1_2)-nd data structure may be connected in a form of a chain.

Especially, as aforementioned, if the (1_1)-st data structure and the (1_2)-nd data structure are Merkle trees, a root value of the (1_1)-st data structure or its processed value may be allocated to a first leaf node of the (1_2)-nd data structure.

Moreover, data integrity may be further ensured by verifying the (1_1)-st data structure when the (1_2)-nd data structure is created. The verification of the (1_2)-nd data structure will be explained later.

Further, in case of a first Merkle tree among at least two Merkle trees connected in a form of a chain, a hash value of a certain message data comprised of text, number or symbol, or a processed value of the hash value may be allocated to a first leaf node of the first Merkle tree. For example, at the time of creation of the first Merkle tree, a hash value of an input message firstly given by the first authentication-supporting server 310 may be allocated.

Figure 3:
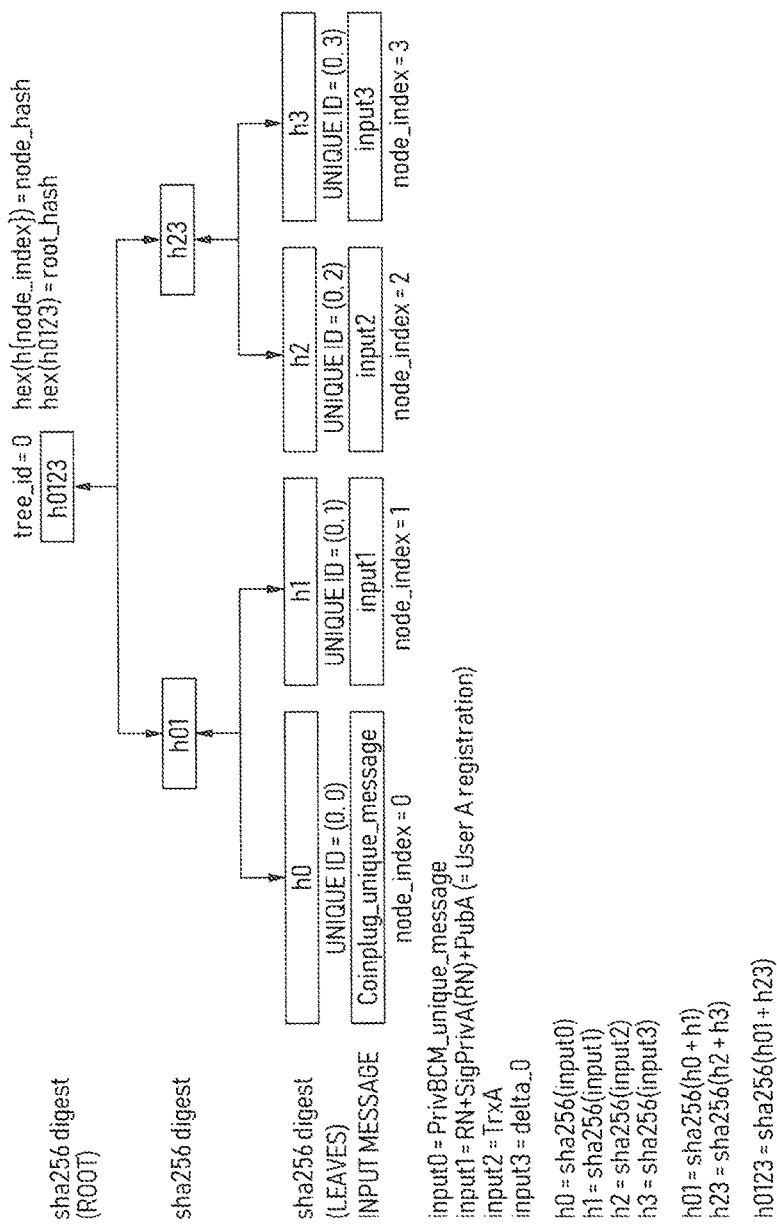
FIGS. 3 and 4 are drawings schematically illustrating another example of registering transactions regarding the SSO in the blockchain networks in accordance with one example embodiment of the present disclosure.
Figure 4:
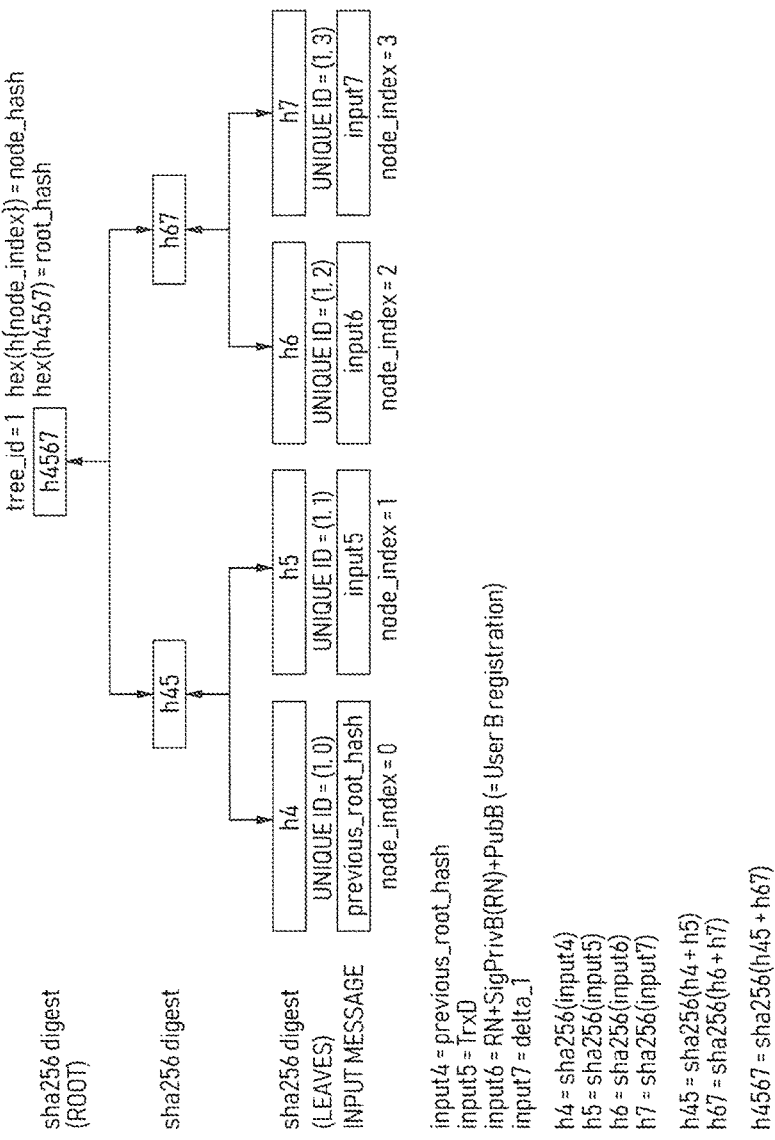

FIGS. 3 and 4 are drawings schematically illustrating examples of Merkle trees created in accordance with one example embodiment of the present disclosure.

FIG. 3 illustrates a Merkle tree with four leaf nodes. As the illustrated Merkle tree is the first Merkle tree whose tree_id is zero, a hash value sha256(coinplug_unique_message) of a certain message data is allocated to an h0 node which is the first leaf node. If there is a request for a registration of a piece of data, the first authentication-supporting server 310 may create a next leaf node next to a last leaf node of the first Merkle tree being generated, and may allocate or support another device to allocate the first specific hash value or it processed value to said next leaf node.

For example, if an allocation of values is completed with an h1 node as a last which is a second leaf node of the Merkle tree in FIG. 3, and if a new leaf node is to be created, then a h2 node which is a next leaf node may be created and the first specific hash value or its processed value sha256 (input2) may be allocated to the h2 node. Further, the first authentication-supporting server 310 may calculate or support another device to calculate an intermediate value by using (i) the first specific hash value allocated to the h2 node and (ii) a hash value allocated to a h3 node which is a sibling node of the h2 node. A hash value of the intermediate value may be allocated to an h23 node which is a parent node of the h2 node and the h3 node. As the parent node, i.e., the h23 node, is not the root node of the Merkle tree, the first authentication-supporting server 310 may repeat the process by regarding the hash value allocated to the h23 node as the first specific hash value.

In other words, with the hash value allocated to the h23 node as the first specific hash value, the hash value allocated to the h23 node and an h01 node may be used together for calculation and allocated to an h0123 node which is a parent node of the h23 node and the h01 node. Herein, as the h0123 node is the root node, the first authentication-supporting server 310 may register or support the (1_1)-st blockchain network or another device connected with the first authentication-supporting server 310 to register the processed value hex(h{node_index}) of the hash value allocated to the h0123 node in the (1_2)-nd blockchain network.

Meanwhile, the anchoring conditions may include at least one of (i) a condition that a certain number of the transactions related to the first user certificate is generated, (ii) a condition that a certain amount of time is elapsed, (iii) a condition that a block is created in the (1_1)-st blockchain network, and (iv) a condition about at least one of characteristics of the services.

On the other hand, for example, if the number of the transactions related to the first user certificate equals the number of leaf nodes in a Merkle tree to be created and if these transactions are acquired, the payment supporting server may create the Merkle tree and may register or support another device to register the root value of the Merkle tree in the (1_2)-nd blockchain network.

Also, the first authentication-supporting server 310 may create a root value of the Merkle tree aforementioned at stated intervals, by referring to the condition (ii) above. In this case, the first authentication-supporting server 310, if a certain amount of time is elapsed, may create a Merkle tree by referring to input values by the time, and may register or support the (1_1)-st blockchain network or another device connected with the first authentication-supporting server 310 to register the root value of the Merkle tree in the (1_2)-nd blockchain network.

However, in this case, a value may not be allocated to a sibling node of the node to which the first specific hash value is allocated even though a certain amount of time is elapsed. In case no hash value is allocated to the sibling node even though at least one of the anchoring conditions is met, the first authentication-supporting server 310 may allocate or support another device to allocate a certain hash value to the sibling node to thereby produce a root value of the Merkle tree by the method aforementioned. For example, the authentication-supporting server 310 may copy and allocate or support another device to allocate the first specific hash value to the sibling node.

The characteristics of the services may be at least part of (i) information on a cost provided by an issuer of the transaction related to the first authentication-supporting server 310, (ii) information on a time-zone during which a registration of the transaction related to the first authentication-supporting server 310 is performed, (iii) information on a location where the registration service of the transaction is performed and (iv) information on a type of a company that requested the registration of the transaction. However, the scope of the present disclosure is not limited thereto.

Meanwhile, if a creation of a new Merkle tree starts and if at least one of the anchoring conditions is satisfied without the transaction related to the first authentication-supporting server 310, the first authentication-supporting server 310 may create or support another device to create the new Merkle tree by allotting certain message data to its first and second leaf nodes and may register or support the (1_1)-st blockchain network or another device connected with the first authentication-supporting server 310 to register the root value of the new Merkle tree or its processed value in the (1_2)-nd blockchain network. In this case, the new Merkle tree with two leaf nodes may be created.

Further, as aforementioned, if the first authentication-supporting server 310 stores the first specific hash value and the at least one associated hash value in the (1_1)-st data structure and then stores and manages the (1_2)-nd data structure identical in a form to the (1_1)-st data structure, the (1_1)-st data structure and the (1_2)-nd data structure may be connected in a form of a chain. Especially, if the (1_1)-st data structure and the (1_2)-nd data structure are Merkle trees, a root value of the (1_1)-st data structure or its processed value may be allocated to a first leaf node of the (1_2)-nd data structure.

FIG. 4 is a drawing illustrating an example of a Merkle tree created in a form of the (1_2)-nd data structure in accordance with one example embodiment of the present disclosure.

By referring to FIG. 4, it is clear that the root value hex(h0123) of the Merkle tree whose tree_id is zero in FIG. 3 is allocated as sha256(input4) to the first leaf node which is an h4 node of a new Merkle tree. In such a manner, the present disclosure has advantage of improving data integrity, as tracking becomes easier even in the case of data forgery, by connecting multiple data structures created when a transaction occurs.

Next, by referring to FIGS. 5A and 5B, an explanation on a method for a registration of a second user certificate in accordance with one example embodiment of the present disclosure will be made as below.

Figure 2:
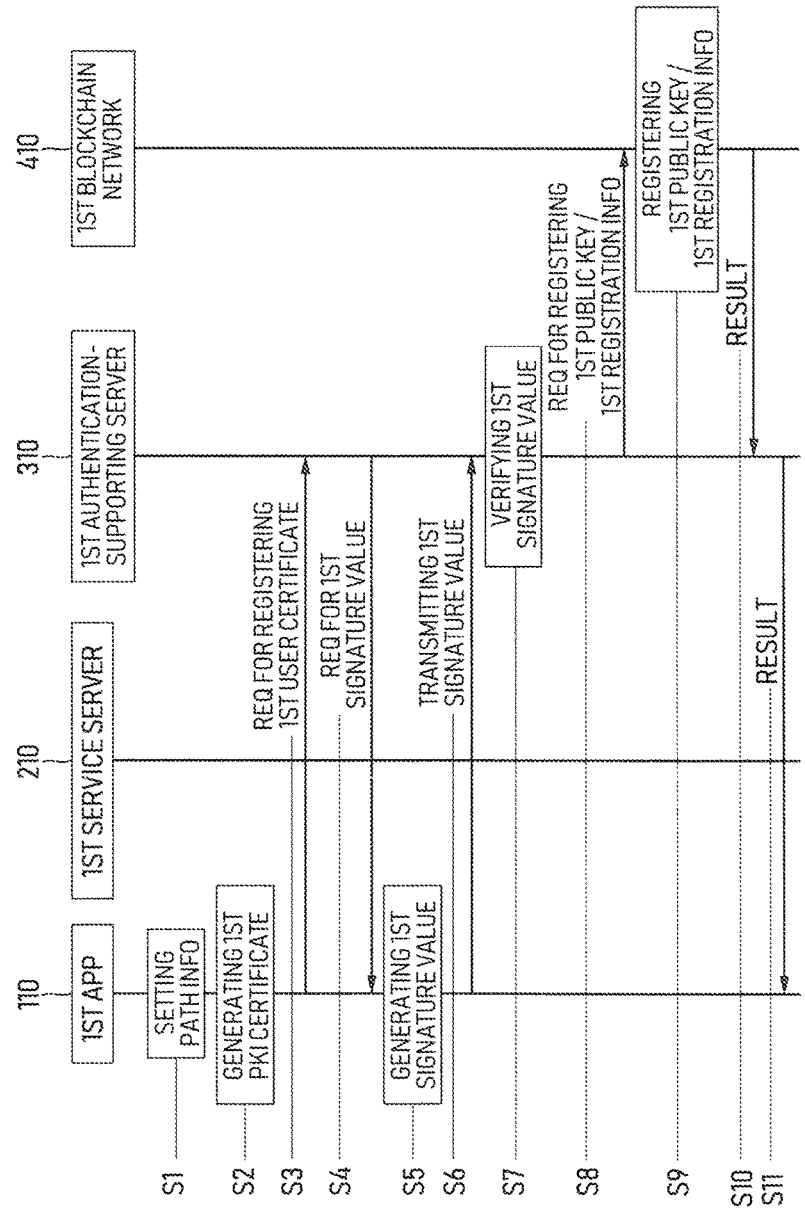
FIG. 2 is a drawing schematically illustrating a method for a registration of a first user certificate in accordance with one example embodiment of the present disclosure.

On condition that the first user certificate corresponding to the first service server 210 has been registered through the method illustrated in FIG. 2, the user may use a second app 120 of the user device 100 to transmit or to support a second service server 220 or another device connected with the user device 100 to transmit a request for confirming a second user certificate in order to register the second user certificate at a step of S21. Herein, the second app 120 may be an app corresponding to the second user certificate among multiple apps installed in the user device 100, and the second user certificate may correspond to one or more services provided by the second service server 220.

Herein, on condition that the user has logged in to the second service server 220 with the general ways using an ID, a password, etc., the user may use the second app 120 of the user device 100 to perform a registration of the second user certificate. Also, the user may use the second app 120 of the user device 100 to perform additional authentication using the ARS, the bank account, the credit card, and the public certificate.

Then, the second authentication-supporting server 320 may transmit or support another device connected with the second authentication-supporting server 320 to transmit the request for confirming the second user certificate by using the user-identifying information or the user device-identifying information to the second blockchain network 420 at a step of S22. In response to the request for confirming the second user certificate, the second blockchain network 420 may confirm the second user certificate by using the user-identifying information or the user device-identifying information at a step of S23 and may transmit a result on confirming the second user certificate to the second authentication-supporting server 320 at a step of S24.

Herein, as the second user certificate has not been registered, the result on confirming the second user certificate may include data representing that there is no second user certificate.

Thereafter, the second authentication-supporting server 320 may transmit or support another device connected with the second authentication-supporting server 320 to transmit a request for confirming the first user certificate to the first authentication-supporting server 310 at a step of S25. Herein, the request for confirming the first user certificate may include the user-identifying information, the user device-identifying information, a hash value of the user-identifying information, or a hash value of the user device-identifying information.

And, in response to the request for confirming the first user certificate acquired from the second authentication-supporting server 320, the first authentication-supporting server 310 may transmit the request for confirming the first user certificate to the first blockchain network 410 at a step of S26. Then, the first blockchain network 410 may confirm whether the first user certificate is registered at a step of S27, and transmit a result on confirming the first user certificate to the first authentication-supporting server 310 at a step of S28. Herein, the result on confirming the first user certificate may include a second verification value for reference, a first app ID corresponding to the first user certificate, and a URL scheme to be used for transmitting the second verification value for reference and for requesting a signature on the second verification value for reference to the first app. Also, the second verification value for reference may include a nonce, an OTP, and a time-stamp, etc.

Meanwhile, if the first blockchain network 410 is configured with the (1_1)-st blockchain network and the (1_2)-nd blockchain network, the first authentication-supporting server 310 may confirm the first representative hash value and its processed value registered in the (1_2)-nd blockchain network in response to acquiring the user-identifying information and the user device-identifying information. Then, the first authentication-supporting server 310 may confirm information on a Merkle tree including its leaf nodes registered in the (1_1)-st blockchain network as corresponding to the first representative hash value and its processed value registered in the (1_2)-nd blockchain network. Also, the first authentication-supporting server 310 may confirm or support another device to confirm the first user certificate registered in the (1_1)-st blockchain network by referring to the information on the Merkle tree including its leaf nodes.

And, the first authentication-supporting server 310 may transmit or support another device connected with the first authentication-supporting server 310 to transmit a result on confirming the first user certificate to the second authentication-supporting server 320 at a step of S29.

Then, the second authentication-supporting server 320 may transmit or support the second service server 220 or another device connected with the second authentication-supporting server 320 to transmit the result on confirming the first user certificate acquired from the first authentication-supporting server 310 to the user device 100 at a step of S30.

And, the user device 100 may receive the result on confirming the first user certificate through the second app 120, and may transmit a request for a second signature value, which is obtained by signing the second verification value for reference, to the first authentication-supporting server 310 by calling the first app 110 at a step of S31. That is, the user device 100 may call the first app 110 by using the URL scheme acquired from the result on confirming the first user certificate, and may allow the first app 110 to sign the second verification value for reference and transmit the second signature value.

Then, the first app 110 of the user device 100 may generate the second signature value by signing the second verification value for reference with the first private key at a step of S32, and may transmit or support the first service server 210 or another device connected with the user device 100 to transmit the second signature value to the first authentication-supporting server 310 at a step of S33. Herein, before generating the second signature value, the first app 110 of the user device 100 may request the user to input the path information, and if the path information inputted by the user is confirmed as valid, i.e., as same as the preset path information, may sign the second verification value for reference with the first private key.

Thereafter, the first authentication-supporting value 310 may verify or support the first blockchain network 410 or another device connected with the first authentication-supporting server 310 to verify the second signature value at steps of S34 and S35.

That is, the first authentication-supporting value 310 may confirm a second verification value for comparison extracted by applying the first public key of the first PKI certificate, which corresponds to the first private key used to sign the second verification value for reference, to the second signature value, and then verify the second signature value by comparing the second verification value for comparison with the second verification value for reference.

And, if the second signature value is determined as valid by the first authentication-supporting server 310 or a result on verifying the second signature value is acquired from the first blockchain network 410 at a step of S36, the first authentication-supporting server 310 may transmit or support the first service server 210 or another device connected with the first authentication-supporting server 310 to transmit the result on verifying the second signature value to the first app 110 of the user device 100 at a step of S37.

Next, the user device 100 may transmit the result on verifying the second signature value acquired from the first app 110 to the second app 120 at a step of S38, and may allow the second app 120 to register the second user certificate.

That is, in response to the result, the user may use the second app 120 of the user device 100 to set second path information for accessing a second PKI certificate, preferably a second private key of the second PKI certificate, at a step of S39. Herein, the second path information may include at least one of (i) a password, (ii) a PIN code, (iii) fingerprint information of the user, and (iv) biometric information of the user. Also, such an input of the second path information may be omitted as the case may be.

Thereafter, if the second path information is set, the user device 100 may allow the second app 120 to generate the second PKI certificate including the second private key and a second public key of the second PKI certificate at a step of S40. Herein, the second private key may be stored in the Secure Elements (SE) of the user device 100.

And, the user device 100 may transmit or support the second service server 220 or another device connected with the user device 100 to transmit information on requesting the registration of the second user certificate using the second PKI certificate generated through the second app 120 to the second authentication-supporting server 320 at a step of S41. Herein, the information on requesting the registration of the second user certificate may include at least one of (i) the second public key, (ii) the user-identifying information such as the phone number, (iii) the user device-identifying information such as the UUID, (iv) second app-identifying information, (v) a push token ID corresponding to the second app, and (vi) the personal information on the user.

Then, the second authentication-supporting server 320 may acquire the information on requesting the registration of the second user certificate transmitted from the user device 100 or the second service server 220 through the communication part of the second authentication-supporting server 320. In response to the information on requesting the registration of the second user certificate acquired through the communication part of the second authentication-supporting server 320, a processor of the second authentication-supporting server 320 may transmit or support the second service server 220 or another device connected with the second authentication-supporting server 320 to transmit a request for a third signature value to the second app 120 of the user device 100 at a step of S42.

And, in response to the request for the third signature value, the second app 120 of the user device 100 may generate the third signature value by signing a third verification value for reference with the second private key of the second PKI certificate at a step of S43. Herein, the third verification value for reference may include a nonce, an OTP (one time password), or a time stamp, etc. Then, the second app 120 may transmit or support the second service server 220 or another device connected with the user device 100 to transmit the generated third signature value to the second authentication-supporting server 320 at a step of S44. Herein, before generating the third signature value, the second app 110 of the user device 100 may request the user to input his or her path information. If the inputted path information is confirmed as valid, i.e., as same as the preset second path information, the second app 120 may generate the third signature value.

Thereafter, the second authentication-supporting server 320 may verify or support the second blockchain network 420 or another device connected with the second authentication-supporting server 320 to verify whether the acquired third signature value is valid at a step of S45.

Herein, the second authentication-supporting server 320 may confirm a third verification value for comparison extracted by applying the second public key of the second PKI certificate, which corresponds to the second private key used to sign the third verification value for reference, to the third signature value, and then verify the third signature value by comparing the third verification value for comparison with the third verification value for reference.

Then, if the third signature value is confirmed as valid, the second authentication-supporting server 320 may transmit or another device connected with the second authentication-supporting server 320 to transmit a request for the registration of the second user certificate including the second public key and registration information thereon to the second blockchain network 420 at a step of S46 to thereby support the second blockchain network 420 to register the second user certificate at a step of S47, and to transmit a result on registering the second user certificate to the second authentication-supporting server 320 at a step of S48. Thereafter, if the result on registering the second user certificate is acquired, the second authentication-supporting server 320 may transmit or support another device connected with the second authentication-supporting server 320 or the second service server 220 to transmit the result on registering the second user certificate to the user device 100 at a step of S49. Herein, the second user certificate registered in the second blockchain network 420 may include at least one of (i) the second public key, (ii) the user-identifying information such as the phone number, (iii) the user device-identifying information such as the UUID, (iv) the second app-identifying information, (v) the push token ID corresponding to the second app, and (vi) the personal information on the user. Also, the second user certificate may include one or more hash values of at least one of (i) the second public key, (ii) the user-identifying information such as the phone number, (iii) the user device-identifying information such as the UUID, (iv) the second app-identifying information, (v) the push token ID corresponding to the second app, and (vi) the personal information on the user.

Otherwise, the second blockchain network 420 may be configured with multiple blockchain networks. As one example, if the second blockchain network 420 is configured with a (2_1)-st blockchain network and a (2_2)-nd blockchain network, the second authentication-supporting server 320 may register the second user certificate in the (2_1)-st blockchain network and the (2_2)-nd blockchain network as below.

The second authentication-supporting server 320 may register or support another device connected with the second authentication-supporting server 320 to register the second user certificate in the (2_1)-st blockchain network and the (2_2)-nd blockchain network.

And, if one or more anchoring conditions for registering a certain hash value in the (2_2)-nd blockchain network are satisfied, the second authentication-supporting server 320 may generate a second specific hash value by applying the hash function to the second user certificate. Then, the second authentication-supporting server 320 may generate a second representative hash value or its processed value, which is a Merkle root, by using the second specific hash value and its corresponding at least one associated hash value.

Also, the second authentication-supporting server 320 may register or support the (2_1)-st blockchain network or another device connected with the second authentication-supporting server 320 to register the generated second representative hash value or its processed value in the (2_2)-nd blockchain network.

Meanwhile, the second authentication-supporting server 320 may store and manage the second specific hash value and the associated hash value in a certain data structure. Herein, the data structure may vary and one example may be a Merkle tree.

That is, the second authentication-supporting server 320 may generate or support another device to generate the Merkle tree whose specific leaf node has the second specific hash value. If the anchoring conditions are satisfied, the second authentication-supporting server 320 may register or support the (2_1)-st blockchain network or another device connected with second authentication-supporting server 320 to register the second representative hash value or its processed value in the (2_2)-nd blockchain network.

More specifically, (x4) the second authentication-supporting server 320 may calculate or support the (2_1)-nd blockchain network or another device connected with the second authentication-supporting server 320 to calculate an intermediate value by using (i) the second specific hash value and (ii) a hash value allocated to a sibling node of a specific leaf node where the second specific hash value is allocated, and may allocate or support the (2_1)-nd blockchain network or another device connected with the second authentication-supporting server 320 to allocate a hash value of the intermediate value to a parent node of the specific leaf node. (x5) If the parent node is a root node of the Merkle tree, the hash value of the intermediate value allocated to the parent node becomes the second representative hash value or its processed value. (x6) Otherwise, if the parent node is not the root node of the Merkle tree, the second authentication-supporting server 320 may repeat or support the (2_1)-st blockchain network or another device connected with the second authentication-supporting server 320 to repeat the processes from (x4) to (x6) by regarding the hash value of the intermediate value allocated to the parent node as the second specific hash value and regarding the parent node as the specific leaf node.

Then, the second authentication-supporting server 320 may register or support the (2_1)-st blockchain network or another device connected with the second authentication-supporting server 320 to register the hash value finally allocated to the root node of the Merkle tree in the (2_2)-nd blockchain network, as the second representative hash value or its processed value. Herein, for example, said its processed value may be acquired by applying the hex computation to the second representative hash value.

Meanwhile, if the second authentication-supporting server 320 stores the second specific hash value and the associated hash value in a (2_1)-st data structure and then stores and manages a (2_2)-nd data structure identical in a form to the (2_1)-st data structure, the (2_1)-st data structure and the (2_2)-nd data structure may be connected in a form of a chain.

Especially, as aforementioned, if the (2_1)-st data structure and the (2_2)-nd data structure are Merkle trees, a root value of the (2_1)-st data structure or its processed value may be allocated to a first leaf node of the (2_2)-nd data structure.

Moreover, data integrity may be further ensured by verifying the (2_1)-st data structure when the (2_2)-nd data structure is created.

Further, in case of a first Merkle tree among at least two Merkle trees connected in a form of a chain, a hash value of a certain message data comprised of text, number or symbol, or a processed value of the hash value may be allocated to a first leaf node of the first Merkle tree. For example, at the time of creation of the first Merkle tree, a hash value of an input message firstly given by the second authentication-supporting server 320 may be allocated.

Examples of the created Merkle trees above may be illustrated according to FIGS. 3 and 4, and an explanation regarding the examples of the Merkle trees will be omitted since it has been made with the method for the registration of the first user certificate.

Next, by referring to FIGS. 6A and 6B, an explanation on a method for the SSO using PKI based on the blockchain networks in accordance with one example embodiment of the present disclosure will be made as below.

Figure 5B:
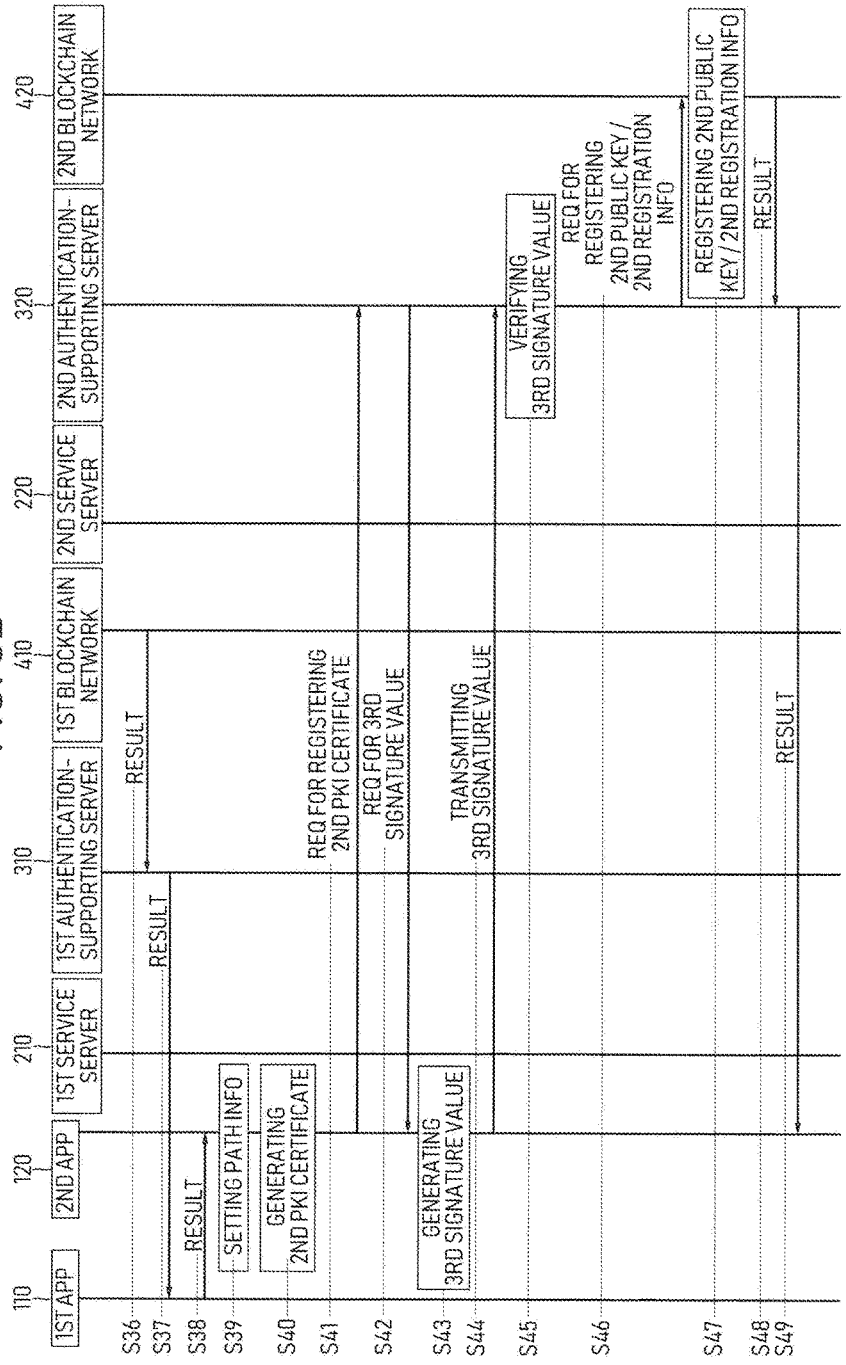

First, in accordance with FIG. 2 or FIGS. 5A and 5B, respective user certificates respectively corresponding to multiple apps of the user device 100, which have been installed in the user device 100 and allow uses of respective services provided by the respective service servers 210 and 220, may be registered in respective blockchain networks 410 and 420.

That is, the first user certificate and the second user certificate respectively corresponding to respective apps 110 and 120 used for the services provided by the respective service servers 210 and 220 may be respectively registered in the first blockchain network 410 and the second blockchain network 420. If the first blockchain network 410 is configured with the (1_1)-st blockchain network and the (1_2)-nd blockchain network, the first user certificate may be registered in the (1_1)-st blockchain network and the first representative hash value or its processed value corresponding to the first user certificate may be registered in the (1_2)-nd blockchain network. Also, if the second blockchain network 420 is configured with the (2_1)-st blockchain network and the (2_2)-nd blockchain network, the second user certificate may be registered in the (2_1)-st blockchain network and the second representative hash value or its processed value corresponding to the second user certificate may be registered in the (2_2)-nd blockchain network.

Under such a condition, if information on requesting the SSO using login information on a specific app of the user device 100 is acquired from the user device 100 or a specific service server, the first authentication-supporting server 310 may confirm or support another device connected with the first authentication-supporting server 310 to confirm whether a specific user certificate corresponding to the login information from the specific app of the user device 100 is registered in a specific blockchain network corresponding to the specific service server. Herein, the login information may include at least one of (i) one or more public keys, (ii) the user-identifying information, and (iii) the user device-identifying information.

And, if it is confirmed that the specific user certificate is registered in the specific blockchain network, the first authentication-supporting server 310 may allow the specific app of the user device 100 to transmit a specific signature value to the first authentication-supporting server 310 by transmitting a request for the specific signature value to the specific app. Herein, the specific signature value is obtained by signing a specific verification value for reference with a specific private key of a specific PKI certificate.

Then, the first authentication-supporting server 310 may allow use of the specific service provided by the specific service server through the specific app, and may register or support another device connected with the first authentication-supporting server 310 to register a specific SSO session corresponding to a log in/out state of the specific app to/of the specific service server.

As one example, the user may use the first app 110 of the user device 100, the first service server 210 or another device connected with the user device 100 to transmit a request for the SSO to the first authentication-supporting server 310 at steps of S61 and S62. Herein, the login information may include at least one of (i) the first public key, (ii) the user-identifying information, and (iii) the user device-identifying information.

Then, the first authentication-supporting server 310 may transmit or support another device connected with the first authentication-supporting server 310 to transmit a request for confirming the first user certificate corresponding to the login information to the first blockchain network 410 at a step of S63.

And, the first blockchain network 410 may confirm the registered first user certificate, in response to the request for confirming the first user certificate transmitted from the first authentication-supporting server 310, at a step of S64 and may transmit a result on confirming the registered first user certificate to the first authentication-supporting server 310 at a step of S65.

If it is confirmed that the first user certificate is registered in the first blockchain network 410, the first authentication-supporting server 310 may transmit or support the first service server 210 or another device connected with the first authentication-supporting server 310 to transmit a request for the first signature value to the first app 110 of the user device 100 at a step of S66.

Then, the user device 100 may call the first app 110 to generate the first signature value by signing the first verification value for reference with the first private key of the first PKI certificate at a step of S67. Further, the user device 100 may transmit or support the first service server 210 or another device connected with the user device 100 to transmit the generated first signature value to the first authentication-supporting server 310 at a step of S68. Herein, before generating the first signature value, the first app 110 of the user device 100 may request the user to input his or her path information. If the inputted path information is confirmed as valid, i.e., as same as the preset first path information, the first app 110 may generate the first signature value.

Thereafter, the first authentication-supporting server 310 may verify or support the first blockchain network 410 or another device connected with the first authentication-supporting server 310 to verify the acquired first signature value at a step of S69. Herein, the verification of the first signature value may be performed by using the first public key corresponding to the first private key used for signing the first verification value for reference. That is, the first authentication-supporting server 310 may acquire the first verification value for comparison extracted by applying the first public key to the first signature value. Then, the first authentication-supporting server 310 may verify the first signature value by comparing the first verification value for comparison with the first verification value for reference.

Then, if the first signature value is confirmed as valid, the first authentication-supporting server 310 may support the first service server 210 to allow use of one or more services, corresponding to the first app 110, through the first app 110 of the user device 100 at steps of S70 and S71.

And, the first authentication-supporting server 310 may transmit or support another device connected with the first authentication-supporting server 310 to transmit a request for registering an SSO session at a step of S72. Then, the first blockchain network 410 may register the SSO session at a step of S73 and transmit a result on registering the SSO session to the first authentication-supporting server 310 at a step of S74.

Herein, in case the first blockchain network 410 is configured with the (1_1)-st blockchain network and the (1_2)-nd blockchain network, if one or more anchoring conditions for registering a certain hash value in the (1_2)-nd blockchain network are satisfied, the first authentication-supporting server 310 may register or support the (1_1)-st blockchain network or another device connected with the first authentication-supporting server 310 to register a second representative hash value or its processed value to the (1_2)-nd blockchain network. Herein, the second representative hash value or its processed value may be calculated by using a second specific hash value or its associated hash value, and the second specific hash value or its associated hash value may be generated by applying the hash function to pieces of information on the SSO logon state.

An explanation on a method for registering the second representative hash value or its processed value in the (1_2)-nd blockchain network will be omitted since it is easily understood by referring to the explanation of FIG. 2 and FIGS. 5A and 5B.

On the other hand, if it is confirmed that the specific user certificate is not registered in the specific blockchain network, the first authentication-supporting server 310 may support at least one second authentication-supporting server 320, among respective second authentication-supporting servers corresponding to the respective service servers, to check or to allow another device connected with the second authentication-supporting server 320 to check an SSO session from at least one certain blockchain network connected with the second authentication-supporting server 320, by transmitting a request for checking to the second authentication-supporting server 320. Then, the first authentication-supporting server 310, if information on checking the SSO session is acquired from the second authentication-supporting server 320, may allow use of a specific service provided by the specific service server through the specific app of the user device 100 by supporting the specific service server or the specific app of the user device 100 to associate with the SSO session.

As one example, if the user transmit a request for the SSO to the second authentication-supporting server 320 through the second app 120 of the user device 100, through another device connected with the user device 100 or through the second service server 220 at steps of S81 and S82, the second authentication-supporting server 320 may transmit or support another device connected with the second authentication-supporting server 320 to transmit the request for confirming the second user certificate to the second blockchain network 420 at a step of S83.

And, the second blockchain network 420 may confirm the registered second user certificate in response to the request for confirming the second user certificate transmitted from the second authentication-supporting server 320 at a step of S84, and may transmit a result on confirming the second user certificate to the second authentication-supporting server 320 at a step of S85.

If it is confirmed that the second user certificate is not registered, the second authentication-supporting server 320 may transmit or support another device connected with the second authentication-supporting server 320 to transmit a request for confirming the SSO session to the first authentication-supporting server 310 at a step of S86. Herein, the request for confirming the SSO session may include the user-identifying information or the user device-identifying information, or a hash value thereof.

Then, the first authentication-supporting server 310 may transmit or support another device connected with the first authentication-supporting server 310 to transmit the request for confirming the SSO session to the first blockchain network 410 at the step of S87. And the first blockchain network 410 may confirm whether the SSO session is registered at the step of S88.

If it is confirmed that the SSO session is registered, the first blockchain network 410 may transmit a result on confirming the SSO Session to the first authentication-supporting server 310 at a step of S89, and the first authentication-supporting server 310 may transmit the result on confirming the SSO Session to the second authentication-supporting server 320 at a step of S90.

Then, the second authentication-supporting server 320 may allow use of the services provided by the second service server 220 through the second app 120 of the user device 100 by supporting the second service server 200 or the second app 120 of the user device 100 to associate with the SSO session at steps of S91 and S92.

The present disclosure has an effect of providing the Single Sign On (SSO) based on blockchain network technology to efficiently protect authentication information on users from external attacks.

The present disclosure has another effect of providing the SSO assuring information security and preventing forgery by applying the hash function and encryption to the user certificates.

The present disclosure has still another effect of providing the SSO preventing problems incurred by information theft beforehand through a user-authentication using the disposable verification values.

Based on the explanation of the above embodiment, those skilled in the art can clearly understand that the present disclosure can be implemented by combination of software and hardware or hardware alone. The part contributing to the prior art or the object of a technical solution of the present disclosure may be implemented in a form of executable program command through a variety of computer components and recorded to computer readable media. The computer readable media may include solely or in combination, program commands, data files, and data structures. The program commands recorded to the media may be components specially designed for the present disclosure or may be known and usable to a skilled human in a general field. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for a Single Sign On (SSO) service using a Public Key Infrastructure (PKI) based on blockchain networks, comprising steps of:

(a) a first authentication-supporting server performing (i) if information on requesting a registration of a first user certificate using a first PKI certificate generated through a first app of a user device is acquired from the user device or from another device connected with the user device, a process of transmitting a request for a first signature value to the first app of the user device, wherein the first app has been installed in the user device and allows use of a first service provided by a first service server, and wherein the first signature value is obtained by signing a first verification value for reference with a first private key of the first PKI certificate, (ii) if the first signature value is acquired from the user device or from another device connected with the user device, a process of verifying or supporting another device connected with the first authentication-supporting server to verify the first signature value, and (iii) if the first signature value is determined as valid, a process of registering or supporting another device connected with the first authentication-supporting server to register the first user certificate in the first blockchain network, wherein the first user certificate includes a first public key of the first PKI certificate and first registration information thereon;

(b) the first authentication-supporting server performing (i) if it is confirmed that a second user certificate is not registered in a second blockchain network in response to a request for confirming the second user certificate by using a second app of the user device, and if information on requesting a verification of the first user certificate is acquired from a second authentication-supporting server connected with a second service server, a process of confirming or supporting another device connected with the first authentication-supporting server to confirm the first user certificate registered in the first blockchain network, wherein the second app has been installed in the user device and allows use of a second service provided by the second service server, and wherein the second user certificate is registered in the second blockchain network as corresponding to the second app, and (ii) a process of allowing the second app to transmit a request for a second signature value to the first app, by transmitting or supporting another device connected with the first authentication-supporting server to transmit a result on verifying the first user certificate including a second verification value for reference to the second app of the user device through the second authentication-supporting server connected with the second service server, wherein the second signature value is obtained by signing the second verification value for reference with the first private key of the first PKI certificate; and (c) the first authentication-supporting server performing (i) if the second signature value is obtained from the first app of the user device or from another device connected with the user device, a process of verifying or supporting the first blockchain network or another device connected with the first authentication-supporting server to verify the second signature value, (ii) if the second signature value is determined as valid, by transmitting or allowing another device connected with the first authentication-supporting server to transmit a result on verifying the second signature value to the first app of the user device, (ii-1) a process of supporting the first app of the user device to transmit the result on verifying the second signature value to the second app of the user device, so as to allow the second app to generate a second PKI certificate and transmit information on requesting a registration of the second user certificate using the second PKI certificate to the second authentication-supporting server, (ii-2) a process of supporting the second authentication-supporting server to transmit a request for a third signature value to the second app in response to the information on requesting the registration of the second user certificate, wherein the third signature value is obtained by signing a third verification value with a second private key of the second PKI certificate, (ii-3) if the third signature value is acquired from the user device or from another device connected with the user device, a process of supporting the second authentication-supporting server to verify or to allow the second blockchain network or another device connected with the second authentication-supporting server to verify the third signature value, and (ii-4) if the third signature value is determined as valid, a process of supporting the second authentication-supporting server to register the second user certificate in the second blockchain network, wherein the second user certificate includes a second public key of the second PKI certificate and second registration information thereon.

2. The method of claim 1, wherein, when either the first app of the user device or the second app of the user device generates its corresponding first PKI certificate or its corresponding second PKI certificate, a user of the user device sets path information for accessing either the first private key of the first PKI certificate or the second private key of the second PKI certificate.

3. The method of claim 1, wherein the first authentication-supporting server confirms either a first verification value for comparison extracted by applying the first public key of the first PKI certificate to the first signature value or a second verification value for comparison extracted by applying the first public key of the first PKI certificate to the second signature value, and verifies or supports the first blockchain network to verify either the first signature value or the second signature value by comparing the first verification value for comparison with the first verification value for reference or the second verification value for comparison with the second verification value for reference.

4. The method of claim 1, wherein the first user certificate registered in the first blockchain network or the second user certificate registered in the second blockchain network includes at least one of (i) the first public key or the second public key, (ii) user-identifying information, (iii) user device-identifying information, (iv) first app-identifying information or second app-identifying information, (v) a push token ID corresponding to either the first app or the second app, and (vi) personal information on the user.

5. The method of claim 1, wherein, at the step of (b), the first authentication-supporting server further adds (i) a first app ID corresponding to the first user certificate confirmed from the first blockchain network and (ii) a URL scheme to be used for transmitting the second verification value for reference to the first app and for requesting a signature on the second verification value for reference into the result on confirming the first user certificate, to thereby transmit or support another device connected with the first authentication-supporting server to transmit the result on confirming the first user certificate to the second app.

6. A method for a Single Sign On (SSO) service using a Public Key Infrastructure (PKI) based on blockchain networks, comprising steps of:
(a) a first authentication-supporting server performing, on condition that respective user certificates using respective PKI certificates generated by multiple apps of a user device have been registered in respective blockchain networks corresponding to respective service servers, if information on requesting an SSO using login information on a specific app of the user device is acquired from the user device or a specific service server, a process of confirming or supporting another device connected with the first authentication-supporting server to confirm whether a specific user certificate corresponding to the login information on the specific app of the user device is registered in a specific blockchain network corresponding to the specific service server, wherein the multiple apps of the user device have been installed in the user device and allow uses of respective services provided by the respective service servers; and
(b) the first authentication-supporting server performing, if it is confirmed that the specific user certificate is not registered in the specific blockchain network, (i) a process of supporting at least one second authentication-supporting server, among respective second authentication-supporting servers corresponding to the respective service servers, to check or to allow another device connected with the second authentication-supporting server to check an SSO session from at least one certain blockchain network connected with the second authentication-supporting server, by transmitting a request for confirming whether there is the SSO session to the second authentication-supporting server, and (ii) if information on checking the SSO session is acquired from the second authentication-supporting server, a process of allowing use of a specific service provided by the specific service server through the specific app of the user device by supporting the specific service server or the specific app of the user device to associate with the SSO session.

7. The method of claim 6, further comprising a step of:
(c) the first authentication-supporting server performing, if it is confirmed that the specific user certificate is registered in the specific blockchain network, (i) processes of transmitting a request for the specific signature value to the specific app of the user device and of allowing the specific app of the user device to transmit a specific signature value to the first authentication-supporting server by transmitting, wherein the specific signature value is obtained by signing a specific verification value for reference with a specific private key of a specific PKI certificate, (ii) if the specific signature value is acquired and determined as valid, a process of allowing use of the specific service provided by the specific service server through the specific app of the user device, and (iii) a process of registering or supporting another device connected with the first authentication-supporting server to register a specific SSO session corresponding to a log in/out state of the specific app of the user device to/of the specific service server in the specific blockchain network.

8. The method of claim 6, wherein, at the step of (a), the respective user certificates respectively include at least one of (i) public keys respectively corresponding to the multiple apps, (ii) user-identifying information, (iii) user device-identifying information, (iv) multiple apps-identifying information, (v) push token IDs respectively corresponding to the multiple apps, and (vi) personal information on the user, and
wherein the login information on the specific app of the user device includes at least one of (i) the public keys, (ii) the user-identifying information, and (iii) the user device-identifying information.

9. The method of claim 7, wherein, at the step of (c), the first authentication-supporting server confirms a specific verification value for comparison extracted by applying a specific public key of the specific PKI certificate to the specific signature value, and verifies or supports either the specific blockchain network or another device connected with the first authentication-supporting server to verify the specific signature value by comparing the specific verification value for comparison with the specific verification value for reference.

10. A first authentication-supporting server for a Single Sign On (SSO) service using a Public Key Infrastructure (PKI) based on blockchain networks, comprising:
at least one memory that stores instructions; and
at least one processor configured to execute the instructions to perform: (I) (I-1) if information on requesting a registration of a first user certificate using a first PKI certificate generated through a first app of a user device is acquired from the user device or from another device connected with the user device, a process of transmitting a request for a first signature value to the first app of the user device, wherein the first app has been installed in the user device and allows use of a first service provided by a first service server, and wherein the first signature value is obtained by signing a first verification value for reference with a first private key of the first PKI certificate, (I-2) if the first signature value is acquired from the user device or from another device connected with the user device, a process of verifying or supporting another device connected with the first authentication-supporting server to verify the first signature value, and (I-3) if the first signature value is determined as valid, a process of registering or supporting another device connected with the first authentication-supporting server to register the first user certificate in the first blockchain network, wherein the first user certificate includes a first public key of the first PKI certificate and first registration information thereon; (II) (II-1) if it is confirmed that a second user certificate is not registered in a second blockchain network in response to a request for confirming the second user certificate by using a second app of the user device, and if information on requesting a verification of the first user certificate is acquired from a second authentication-supporting server connected with a second service server, a process of confirming or supporting another device connected with the first authentication-supporting server to confirm the first user certificate registered in the first blockchain network, wherein the second app has been installed in the user device and allows use of a second service provided by the second service server, and wherein the second user certificate is registered in the second blockchain network as corresponding to the second app, and (II-2) a process of allowing the second app to transmit a request for a second signature value to the first app, by transmitting or supporting another device connected with the first authentication-supporting server to transmit a result on verifying the first user certificate including a second verification value for reference to the second app of the user device through the second authentication-supporting server connected with the second service server, wherein the second signature value is obtained by signing the second verification value for reference with the first private key of the first PKI certificate; and (III) (III-1) if the second signature value is obtained from the first app of the user device or from another device connected with the user device, a process of verifying or supporting the first blockchain network or another device connected with the first authentication-supporting server to verify the second signature value, (III-2) if the second signature value is determined as valid, by transmitting or allowing another device connected with the first authentication-supporting server to transmit a result on verifying the second signature value to the first app of the user device, (III-2-a) a process of supporting the first app of the user device to transmit the result on verifying the second signature value to the second app of the user device, so as to allow the second app to generate a second PKI certificate and transmit information on requesting a registration of the second user certificate using the second PKI certificate to the second authentication-supporting server, (III-2-b) a process of supporting the second authentication-supporting server to transmit a request for a third signature value to the second app in response to the information on requesting the registration of the second user certificate, wherein the third signature value is obtained by signing a third verification value with a second private key of the second PKI certificate, (III-2-c) if the third signature value is acquired from the user device or from another device connected with the user device, a process of supporting the second authentication-supporting server to verify or to allow the second blockchain network or another device connected with the second authentication-supporting server to verify the third signature value, and (III-2-d) if the third signature value is determined as valid, a process of supporting the second authentication-supporting server to register the second user certificate in the second blockchain network, wherein the second user certificate includes a second public key of the second PKI certificate and second registration information thereon.

11. The first authentication-supporting server of claim 10, wherein, when either the first app of the user device or the second app of the user device generates its corresponding first PKI certificate or its corresponding second PKI certificate, a user of the user device sets path information for accessing either the first private key of the first PKI certificate or the second private key of the second PKI certificate.

12. The first authentication-supporting server of claim 10, wherein the processor confirms either a first verification value for comparison extracted by applying the first public key of the first PKI certificate to the first signature value or a second verification value for comparison extracted by applying the first public key of the first PKI certificate to the second signature value, and verifies or supports the first blockchain network to verify either the first signature value or the second signature value by comparing the first verification value for comparison with the first verification value for reference or the second verification value for comparison with the second verification value for reference.

13. The first authentication-supporting server of claim 10, wherein the first user certificate registered in the first blockchain network or the second user certificate registered in the second blockchain network includes at least one of (i) the first public key or the second public key, (ii) user-identifying information, (iii) user device-identifying information, (iv) first app-identifying information or second app-identifying information, (v) a push token ID corresponding to either the first app or the second app, and (vi) personal information on the user.

14. The first authentication-supporting server of claim 10, wherein, at the process of (II), the processor further adds (i) a first app ID corresponding to the first user certificate confirmed from the first blockchain network and (ii) a URL scheme to be used for transmitting the second verification value for reference to the first app and for requesting a signature on the second verification value for reference into the result on confirming the first user certificate, to thereby transmit or support another device connected with the first authentication-supporting server to transmit the result on confirming the first user certificate to the second app.

15. A first authentication-supporting server for a Single Sign On (SSO) service using a Public Key Infrastructure (PKI) based on blockchain networks, comprising:
at least one memory that stores instructions; and
at least one processor configured to execute the instructions to perform: (I) on condition that respective user certificates using respective PKI certificates generated by multiple apps of a user device have been registered in respective blockchain networks corresponding to respective service servers, if information on requesting an SSO using login information on a specific app of the user device is acquired from the user device or a specific service server, a process of confirming or supporting another device connected with the first authentication-supporting server to confirm whether a specific user certificate corresponding to the login information on the specific app of the user device is registered in a specific blockchain network corresponding to the specific service server, wherein the multiple apps of the user device have been installed in the user device and allow uses of respective services provided by the respective service servers; and (II) the first authentication-supporting server performing, if it is confirmed that the specific user certificate is not registered in the specific blockchain network, (II-1) a process of supporting at least one second authentication-supporting server, among respective second authentication-supporting servers corresponding to the respective service servers, to check or to allow another device connected with the second authentication-supporting server to check an SSO session from at least one certain blockchain network connected with the second authentication-supporting server, by transmitting a request for confirming whether there is the SSO session to the second authentication-supporting server, and (II-2) if information on checking the SSO session is acquired from the second authentication-supporting server, a process of allowing use of a specific service provided by the specific service server through the specific app of the user device by supporting the specific service server or the specific app of the user device to associate with the SSO session.

16. The first authentication-supporting server of claim 15, further comprising a process of:
(III) if it is confirmed that the specific user certificate is registered in the specific blockchain network, (III-1) processes of transmitting a request for the specific signature value to the specific app of the user device and of allowing the specific app of the user device to transmit a specific signature value to the first authentication-supporting server by transmitting, wherein the specific signature value is obtained by signing a specific verification value for reference with a specific private key of a specific PKI certificate, (III-2) if the specific signature value is acquired and determined as valid, a process of allowing use of the specific service provided by the specific service server through the specific app of the user device, and (III-3) a process of registering or supporting another device connected with the first authentication-supporting server to register a specific SSO session corresponding to a log in/out state of the specific app of the user device to/of the specific service server in the specific blockchain network.

17. The first authentication-supporting server of claim 15, wherein, at the process of (I), the respective user certificates respectively include at least one of (i) public keys respectively corresponding to the multiple apps, (ii) user-identifying information, (iii) user device-identifying information, (iv) multiple apps-identifying information, (v) push token IDs respectively corresponding to the multiple apps, and (vi) personal information on the user, and wherein the login information on the specific app of the user device includes at least one of (i) the public keys, (ii) the user-identifying information, and (iii) the user device-identifying information.

18. The first authentication-supporting server of claim 15, wherein, at the process of (III), the processor confirms a specific verification value for comparison extracted by applying a specific public key of the specific PKI certificate to the specific signature value, and verifies or supports either the specific blockchain network or another device connected with the first authentication-supporting server to verify the specific signature value by comparing the specific verification value for comparison with the specific verification value for reference.

* * * * *